United States Patent [19]
Zeto et al.
[11] Patent Number: 4,986,876
[45] Date of Patent: Jan. 22, 1991

[54] METHOD OF SMOOTHING PATTERNED TRANSPARENT ELECTRODE STRIPES IN THIN FILM ELECTROLUMINESCENT DISPLAY PANEL MANUFACTURE

[75] Inventors: Robert J. Zeto, Eatontown; Eugene Hryckowian, deceased, late of Ocean, by Linda V., executor; David C. Morton, Eatontown, all of N.J.; John A. Costello, Annapolis, Md.; John C. Conrad, Ocean, N.J.

[73] Assignee: The United States of America as represented by the Secretary of the Army, Washington, D.C.

[21] Appl. No.: 521,879

[22] Filed: May 7, 1990

[51] Int. Cl.[5] .......... B44C 1/22; C03C 15/00; C03C 25/06

[52] U.S. Cl. .......... 156/643; 156/646; 156/657; 156/659.1; 156/663; 156/667; 204/192.34

[58] Field of Search .......... 156/643, 646, 653, 655, 156/656, 657, 659.1, 663, 667, 668; 204/192.22, 192.23, 192.29, 192.3, 192.34; 437/181

[56] References Cited

U.S. PATENT DOCUMENTS

| | | | |
|---|---|---|---|
| 4,331,758 | 5/1982 | Luo | 430/313 |
| 4,523,975 | 6/1985 | Groves et al. | 156/643 |
| 4,624,737 | 11/1986 | Shimbo | 437/181 X |
| 4,676,868 | 6/1987 | Riley et al. | 156/643 |
| 4,692,204 | 9/1987 | Fabien et al. | 156/626 |
| 4,816,112 | 3/1989 | Books et al. | 156/628 |
| 4,869,777 | 9/1989 | Apschel et al. | 156/626 |

*Primary Examiner*—William A. Powell
*Attorney, Agent, or Firm*—Michael Zelenka; Roy E. Gordon

[57] ABSTRACT

In the manufacture of a thin film electroluminescent display panel, patterned transparent electrode stripes on a glass substrate are smoothed by:

(A) depositing a uniform layer of dielectric material over the entire substrate bearing the patterned transparent electrode stripes, (B) applying a uniform layer of an organic flowable photoresist material over the layer of dielectric, (C) heating the coated substrate to a temperature at which the photoresist layer flows, and (D) etching back through the layers to the transparent electrode.

9 Claims, 1 Drawing Sheet

Figure 1:
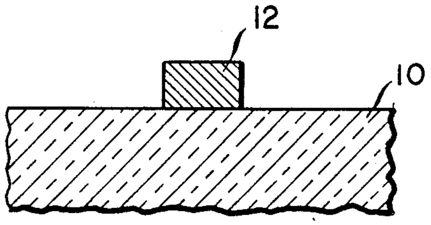

METHOD OF SMOOTHING PATTERNED TRANSPARENT ELECTRODE STRIPES IN THIN FILM ELECTROLUMINESCENT DISPLAY PANEL MANUFACTURE

The invention described herein may be manufactured, used, and licensed by or for the Government for governmental purposes without the payment to us of any royalty thereon.

This invention relates in general to an improvement in the manufacture of a thin film electroluminescent (EL) display panel and in particular to a method of smoothing patterned transparent electrode stripes in that manufacture.

BACKGROUND OF THE INVENTION

A thin film electroluminescent (TFEL) panel is comprised of thin phosphor, insulator, and electrode layers or films deposited on a glass substrate in a multilayer structure. The electrode in contact with the glass substrate must be transparent for viewing. The electrode can be tin oxide or indium oxide or preferably a mixture of indium and tin oxides (ITO). It is the first layer or film deposited in panel fabrication and is patterned into columns. The result is a step at the edge of the ITO columns whose height depends on the thickness of the ITO film. Observation of panel failure reveals that it is associated with the step edges of the ITO columns. This is due both to structural defects that occur in the films over the step edge, and to an enhanced electric field effect caused by the closer proximity of the top and bottom electrodes along the sidewall. Due to these factors, the typical ITO thickness is about 0.25 micron, and step edge breakdown is the major panel failure mode. The limitation on ITO thickness imposes a major barrier for large area displays since the high electrical resistance of the electrode causes a voltage drop and non-uniform brightness along the electrode line.

SUMMARY OF THE INVENTION

The general object of this invention is to provide a method of improving the manufacturing yield and operational reliability of thin film EL panels. A further object of the invention is to improve the performance characteristics of thin film EL panels and to make possible the fabrication of large area and color thin film EL panels that were heretofore unrealizable.

It has now been found that the aforementioned objects can be attained by a method of smoothing the patterned transparent electrode stripes on the glass substrate in the manufacture of the thin film EL display panel, the method including the steps of (A) depositing a uniform layer of dielectric material over the entire substrate bearing the patterned transparent electrode stripes, (B) applying a uniform layer of photoresist material over the layer of dielectric, (C) heating the coated substrate to a temperature at which the photoresist layer flows, and (D) etching back through the layers to the transparent electrode.

The dielectric material used must be compatible with the thin film EL display panel, and the dielectric layer should be about the same thickness as the transparent electrode. Suitable dielectric materials include silicon nitride, silica, yttrium oxide, and alumina of which silicon nitride is preferred. The dielectric layer can be conveniently sputter deposited.

As the photoresist material, any flowable organic photoresist that is commercially available can be used. The photoresist layer is conveniently about 0.5 to 2.0 microns in thickness.

It is in step (C) that the surface topography is changed and the step features at the edges of the transparent electrode smoothed. This is caused by heating the coated substrate to about 200° C. for about 45 minutes.

In step (D), the preferred method of etching back is ion beam milling because of its non selective etch rates with the films on the substrate, but other etching methods such as reactive ion etching can also be used.

DESCRIPTION OF THE DRAWING AND THE PREFERRED EMBODIMENT

The method of the invention is shown by the following description of its use for the smoothing or planarization of patterned ITO transparent electrode stripes on a glass substrate.

FIG. 1 of the drawing shows the structure before the application of the invention method.

Figure 2:
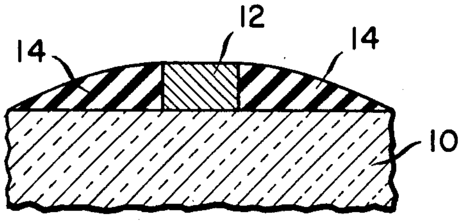

FIG. 2 of the drawing shows the structure after the application of the invention method.

Referring to FIG. 1 and FIG. 2 of the drawing which is not drawn to scale, the glass substrate, 10, bears ITO transparent electrode stripes 12. The stripes, 12, are smoothed or planarized by the layer of dielectric, 14, as indicated.

The edges of the ITO stripes are steep after deposition and patterning, particularly for ITO thicknesses greater than about 0.3 micrometer. It is this surface feature that is desired to be smoothed or planarized since subsequently deposited films in the EL stack are thinner along the sidewall which ultimately leads to panel breakdown. A dielectric film of silicon nitride, whose thickness is approximately equivalent to the thickness of ITO, is first deposited since this is a suitable material to remain between ITO stripes in the manufactured panel structure. The topography and step height at the ITO electrode edge are about the same as the original substrate. Then an organic photoresist material such as Olin Hunt Waycoat HPR-204, whose thickness is approximately between 1 and 2 micrometers, is deposited over the surface by a spin-on technique. The topography over the ITO edge is slightly smoothed and the step height reduced. The structure is then heated in an oven at about 200 degrees Centigrade for about 45 minutes. The photoresist material has the desirable property that it flows and planarizes upon heating and, consequently, there is a significant surface planarization over the ITO edge. The planarization procedure is then completed by an etch-back of the structure to the ITO electrode using high angle argon ion milling. Additional planarization of surface features is achieved during etchback by rotating the substrate in the beam with a fixed angle of incidence of about 65 degrees, since the etch rate varies with the angle of incidence of the ion beam to a surface feature. An advantage of the argon ion milling method is that it is relatively non-selective with respect to the etch rate of the various film materials in the structure. The final structure has a slightly convex surface of ITO with a tapered dielectric adjacent to the ITO sidewall. This inventive procedure removes the sharp step at the original ITO sidewall. Conventional procedure is subsequently employed to fabricate the complete thin film EL panel. Whereas conventional thin film EL panels are limited to an ITO thickness of about 0.25 micrometer, ITO stripes with thickness between 0.3 and 1.0 micrometer have been planarized by this method. The viability of the inventive method has been demonstrated by the fabrication of functional thin film EL panels, 1-inch by 1-inch square active area, with an ITO thickness of about 1 micrometer. These panels had equivalent luminance, higher breakdown voltage, and more than an order of magnitude lower line resistance than a conventional panel. It is also believed that a functional thin film EL panel with 1 micrometer ITO thickness has never been made heretofore.

We wish it to be understood that we do not desire to be limited to the exact details of construction shown and described for obvious modifications will occur to a person skilled in the art.

What is claimed is:

1. A method of smoothing patterned transparent electrode stripes on a glass substrate in the manufacture of a thin film electroluminescent (EL) display panel, said method including the steps of:

(A) depositing a uniform layer of dielectric material over the entire glass substrate bearing the patterned transparent electrode striping.

(B) applying a uniform layer of an organic flowable photoresist material over the layer of dielectric, (C) heating the coated substrate to a temperature at which the photoresist layer flows, and (D) etching back through the layers to the transparent electrode.

2. Method according to claim 1 wherein the transparent electrode is selected from the group consisting of indium-tin-oxide (ITO), tin oxide, and indium oxide.

3. Method according to claim 2 wherein the transparent electrode is indium-tin-oxide.

4. Method according to claim 1 wherein the dielectric material is compatible with the panel.

5. Method according to claim 4 wherein the dielectric material is silicon nitride.

6. Method according to claim 5 wherein the dielectric layer is of about the same thickness as the patterned electrode stripes.

7. Method according to claim 1 wherein in step (C) the sample is heated to about 200° C. for about 45 minutes to cause flow of the photoresist.

8. Method according to claim 1 wherein high angle argon ion milling is used to etch back to the transparent electrode.

9. A method of smoothing patterned transparent electrode stripes of indium-tin-oxide (ITO) on a glass substrate in the manufacture of a thin film electroluminescent (EL) display panel, said method including the steps of:

(A) depositing a uniform layer of silicon nitride over the entire substrate bearing the patterned transparent electrode stripes where the layer of silicon nitride is of about the same thickness as the patterned electrode stripes, (B) applying a uniform coating of about 0.5 to 2.0 micron in thickness of an organic flowable photoresist over the layer of silicon nitride, (C) heating the sample to about 200° C. for about 45 minutes to smooth step features at the edges of the indium-tin-oxide line, and (D) etching back to the transparent electrode using high angle argon ion milling.

* * * * *